Figure 1:
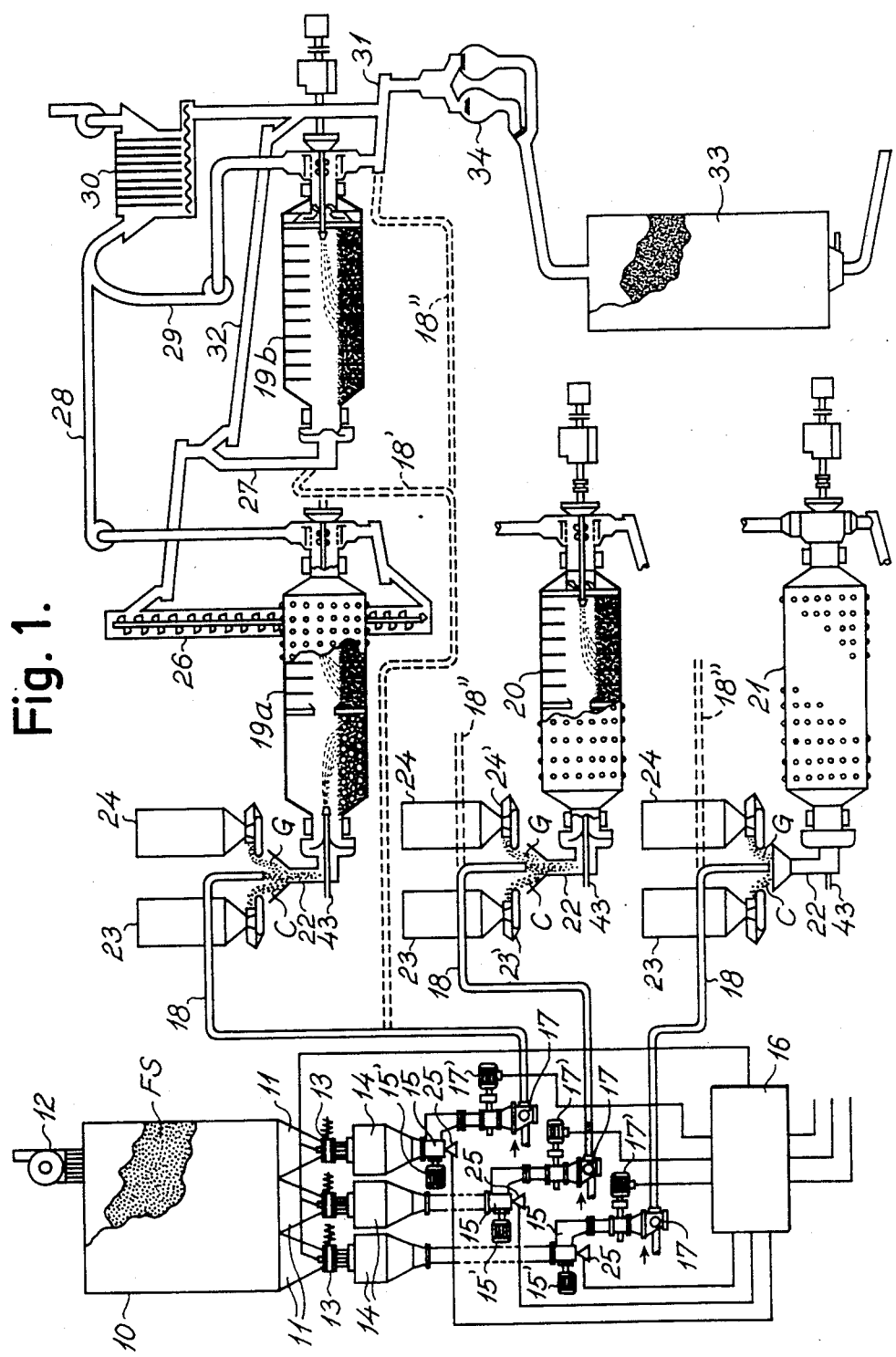

United States Patent [19]

Rasmussen

[11] Patent Number: 4,572,739
[45] Date of Patent: Feb. 25, 1986

[54] METHOD FOR REDUCING CHROMATE DERMATITIS

[76] Inventor: Poul L. Rasmussen, Fabriksvej 18, Rønne, Denmark, DK-3700

[21] Appl. No.: 617,835

[22] PCT Filed: Dec. 16, 1981

[86] PCT No.: PCT/DK81/00115
§ 371 Date: Aug. 16, 1982
§ 102(e) Date: Aug. 16, 1982

[87] PCT Pub. No.: WO82/02040
PCT Pub. Date: Jun. 24, 1982

Related U.S. Application Data

[63] Continuation of Ser. No. 413,351, Aug. 16, 1982, abandoned.

[30] Foreign Application Priority Data

Dec. 17, 1980 [DK] Denmark ............................. 5380/80
Sep. 17, 1981 [DK] Denmark ............................. 4140/81

[51] Int. Cl.[4] .............................................. C04B 7/54
[52] U.S. Cl. ........................................ 106/101; 106/102
[58] Field of Search ................................. 106/101, 102

[56] References Cited

U.S. PATENT DOCUMENTS

| | | | |
|---|---|---|---|
| 2,316,039 | 4/1943 | Wilson | 106/109 |
| 3,425,892 | 2/1969 | Edelson et al. | 106/102 |
| 4,122,059 | 10/1978 | Hansen | 106/90 |
| 4,209,335 | 6/1980 | Katayama et al. | 106/97 |

FOREIGN PATENT DOCUMENTS

| | | | |
|---|---|---|---|
| 2042227 | 8/1970 | Fed. Rep. of Germany | 106/89 |
| 1503617 | 10/1967 | France | 106/89 |
| 311604 | of 0000 | Sweden | 106/89 |
| 534643 | 4/1973 | Switzerland | 106/89 |
| 21315 | of 1910 | United Kingdom | 106/102 |
| 1129008 | 9/1966 | United Kingdom | 106/89 |

OTHER PUBLICATIONS

Contact Dermatitis 5, 39–42, (1979), Fregert et al.
Chemical Abstracts, vol. 88, No. 20, p. 273, col. 2.
Berufs Derufsdermatosen 20, 5, 238–248 (1972), S. Fregert et al.
"The Technology of Binders", Butt et al., Moscow (1952) pp. 342–343.

Primary Examiner—William R. Dixon, Jr.
Assistant Examiner—Steven Capella
Attorney, Agent, or Firm—Stiefel, Gross, Kurland & Pavane

[57] ABSTRACT

A dry cement composition containing an amount of ferrous sulphate (FS) for eliminating or substantially reducing the content of water-soluble chromate, is produced by grinding a starting material (C, G) in a cement mill, and the ground cement material is passed from the mill to a storage container (33). The ferrous sulphate in an amount of 0.01–10 and preferably 0.4 percent by weight is added to and mixed with the starting material in a dry or non-dissolved condition at a location or at locations upstreams of the storage container (33). The ferrous sulphate is preferably added to the starting material upstream of the cement mill.

8 Claims, 2 Drawing Figures

METHOD FOR REDUCING CHROMATE DERMATITIS

This is a continuation of application Ser. No. 413,351, filed 8-16-82, now abandoned.

The present invention relates to a method and a plant for producing a dry cement composition which, when mixed with water, gives an immeasurable or low concentration of $Cr^{+6}$ (in the following also called "chromate") dissolved in the water.

Cement is normally manufactured by grinding a starting material including cement binder clinker and gypsum, and in some cases also other additives, such as fly ash, slag, puzzolane, and grinding aid, the starting material being continuously supplied to and ground in a cement mill. The conventional cement mill is a ball grinder comprising a rotating drum with very large dimensions, such as a length of 15 m and a diameter of 5 m. In operation such a huge ball grinder generates an excessive amount of heat. In order to prevent the temperature in the mill from exceeding an acceptable level, the mill is normally cooled by spraying or atomizing water into the inner space of the rotating drum. Consequently, the atmosphere within a conventional cement mill has a relatively high temperature (normally 120°-140° C.) and a high humidity (about 0.3 kg water vapour per kg air). Thus, the cement mterial is exposed to rather vigorous conditions when treated in the cement mill. Furthermore, during the manufacturing process ground cement composition is normally transported by means of pneumatic transporting devices whereby almost each single cement particle is brought into intimate contact with the transporting air.

It has been known for a long time that cements contain chromium compounds which, when cements are mixed with water, appear as $Cr^{+6}$ dissolved in the water, and that this dissolved chromate is objectionable from a health point of view, because it may cause eczema in persons working with the cement-water mixtures when it comes into contact with their skin.

It is known to reduce the concentration of dissolved chromate in a cement-water mixture and in wet concrete by adding ferrous sulfate during the mixing process for producing said mixture. The ferrous ion of ferrous sulfate reduces the $Cr^{+6}$ to $Cr^{+3}$ which is only slightly soluble in cement-water mixtures. In "Annex 3 to circular letter 15" issued by CEMBUREAU (European Cement Association), Paris, and dated 1st Mar., 1979, it is proposed to dissolve the ferrous sulfate as a 20% solution before the addition. Said annex also describes an experiment in which it was attempted to add the ferrous sulfate solution during the manufacturing process of the cement. The ferrous sulfate was sprayed into the hot and humid clinker in a cement mill together with gypsum. The annex concludes that hardly any chromate was then reduced, even if double the normal dose of ferrous sulfate was added. A better, but still unsatisfactory result was obtained by heating the clinker and gypsum to 140° C. after milling and spraying a solution of ferrous sulfate on the hot cement. Furthermore, in a paper issued by CEMENTA AB and dated 13th Oct., 1977 the authors of the above publication state that ferrous sulfate cannot be added prior to grinding in a cement factory because the environment in the mill causes iron(II) sulfate to oxidize into inactive iron(III) sulfate, and it is concluded that no practical possibility of eliminating chromium compounds in the manufacture of cement exists.

U.S. Pat. No. 3,425,892 issued on 4th Feb., 1969, discloses a cement composition containing 0.1–5% of ferrous sulfate for the purpose of retarding the hardening rate of the cement composition. Said U.S. patent does not at all relate to reduction of water-soluble chromate in cement mixtures.

It has now been found that contrary to the teachings of the above mentioned publications from CEMBUREAU and CEMENTA it is possible to reduce the content of dissolved chromate in a cement-water mixture and in wet concrete by adding ferrous sulfate to the cement during the manufacturing stage, namely if the ferrous sulfate is added in a dry or non-dissolved condition.

Thus, the present invention provides a method of producing a dry cement composition, said method comprising feeding a continuous flow of a starting material, which includes cement binder clinker and a content of water-soluble chromate, to a cement mill, grinding the starting material in the cement mill while introducing a cooling medium, such as air or water, into the mill so as to maintain the temperature of the material in the mill at a desired level, continuously discharging the ground cement material from the cement mill, and transferring ground cement material to a storage container and, in accordance with the invention, adding the ferrous sulfate ($FeSO_4 \cdot nH_2O$) in an amount of 0.1–10% by weight is added to and mixing it with said flow of material in a dry or non-dissolved condition and at a location or at locations upstream of said storage container in order to eliminate or substantially reduce said content of water-soluble chromate.

Surprisingly, it has been found that ferrous sulfate is able to resist the rather extreme temperature and humidity conditions existing within the cement mill without an unacceptable reduction of its chromate-reducing ability, provided that the ferrous sulfate is added in a dry or non-dissolved condition.

The amount of ferrous sulfate to be added depends i.a. on the amount of chromate contained in the cement, and as the chromate-reducing ability of the ferrous sulfate may decrease during the period of time in which the finished cement composition is stored before use, the necessary amount of ferrous sulfate may also depend on the stipulated storage time of the cement composition. The longer the cement mixture is to be stored, the more ferrous sulfate is required.

In the present context, the terms "cement", "cement composition", and "cement mixture" comprises Portland cement types, including ordinary cement, rapid-hardening cement and super-rapid-hardening cement, high alumina cement, belite cement, and low heat cement; and blended cements, puzzolan cements, slag cements, etc., in particular Portland cements and blended cements.

It is believed that the tendency of the chromate-reducing ability of the ferrous sulfate may be avoided or to some extent diminished if the ferrous sulfate to decrease is in the form of a particulate material in which the particles are provided with an oxidation-preventing coating. Ferrous sulfate of this type is marketed by Melchemie B.V., Arnhem, Holland, under the trade marks MELSTAR and FERROMEL-20. In the method of the present invention, it may be advantageous to use ferrous sulfate with particles which are provided with a coating which is even thicker than that used in the product sold under the above trade marks.

The ferrous sulfate may be added in an amount of 0.01–5, preferably 0.1–1 percent by weight. If the amount exceeds 1 percent, the ferrous sulfate may have an undesired retarding effect on the hardening rate of the cement mixture when water and aggregate have been added thereto. A still more preferred amount of ferrous sulfate is 0.3–1 percent. At present an amount of about 0.4 percent by weight is especially preferred in connection with cement compositions of the type in which the starting material comprises clinker made from clay and chalk, while a smaller percentage of ferrous sulfate, such as 0.1 percent, may be sufficient when the clinkers are made from sand and chalk, because the contents of chromium compositions in sand are substantially smaller than in clay.

The ferrous sulfate may be added to the flow of starting material at one or more suitable locations upstream of the storage container. Thus, the total metered flow of the ferrous sulfate or at least part thereof is preferably added to the starting material upstream of the cement mill in which ferrous sulfate is very thoroughly mixed with the starting material during the grinding process taking place therein. As explained above, conditions within the cement mill may to some extent reduce the chromate-reducing ability of the ferrous sulfate. Therefore, when the cement mill is of a multistage type, the ferrous sulfate or at least part thereof is preferably added to the starting material between consecutive stages of the mill, and advantageously between the next to the last stage and the last stage. The desired thorough mixing of the starting material and the ferrous sulfate is thereby obtained, while the residence time of the ferrous sulfate within the mill is reduced to a minimum.

It is also possible to add the ferrous sulfate or at least part thereof to the ground starting material at a location downstream of the cement mill and upstream of the storage container, for example at the inlet of a pneumatic transporting device for transporting the ground cement material to the storage container. The ground cement material and the particulate ferrous sulfate added thereto downstream of the cement mill may be sufficiently intermixed by passage through the pneumatic transporting device. However, it is also possible to increase the mixing efficiency by passing the flow of material through a special mixing device of any suitable type. Provided that it is possible to obtain an efficient mixing of the components of the cement composition, the amount of ferrous sulfate added to the starting material downstream of the cement mill may be somewhat smaller than when the sulfate is added upstream of the cement mill.

The content of ferrous sulfate in the finished cement composition retards the hardening rate of concrete made from this cement composition. It has been found, however, that this side effect is without any significance, especially when the amount of ferrous sulfate added is less than one percent, which is normally the case. The content of ferrous sulfate in the cement composition also causes a "thickening effect" which means that poured and vibrated concrete made from the cement composition does not tend to separate water on the surface like concrete made from a cement composition without ferrous sulfate.

The invention also relates to a plant for carrying out the method described above which comprises at least one cement mill, feeding means for feeding a continuous flow of a starting material, including cement binder clinker, to the mill, a storage container for the finished cement composition, and transporting means for transporting ground cement material discharged from the mill to the storage container, and the plant according to the invention is characterized in that it further comprises a supply container for ferrous sulfate and metering means for feeding a metered continuous flow of ferrous sulfate from the supply container into the flow of starting material at a location or at locations upstream of the storage container.

Figure 2:
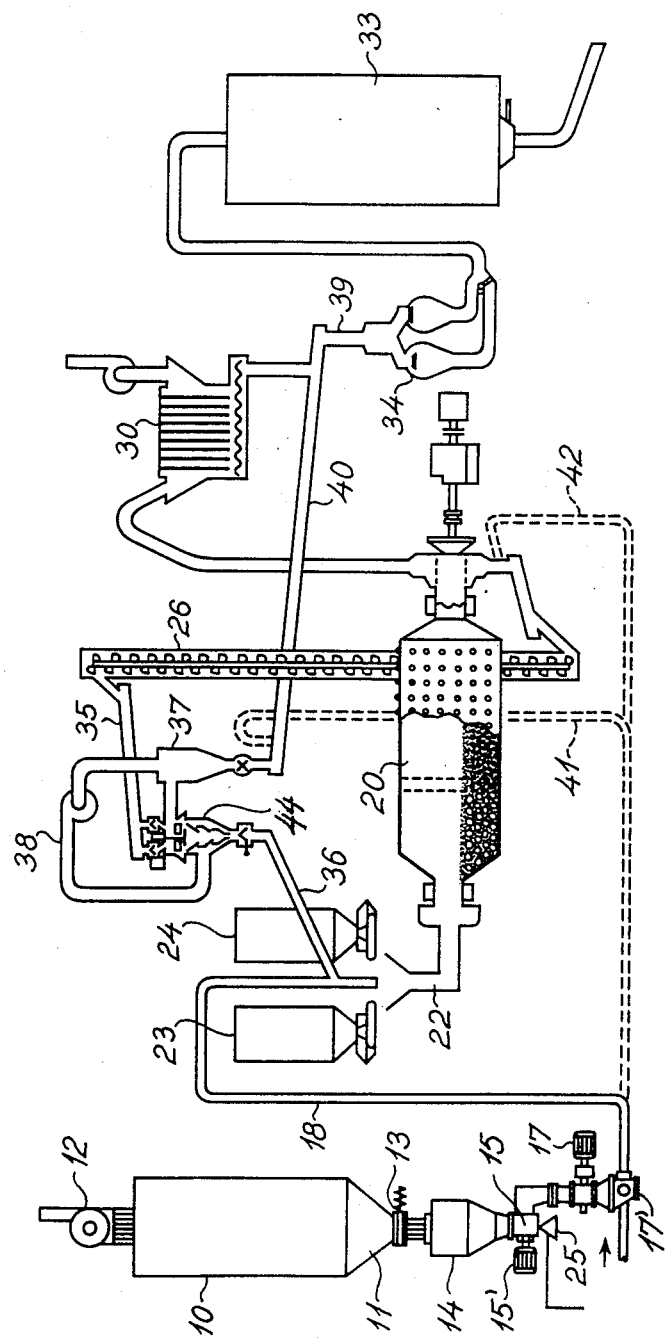

The invention will now be further described with reference to the drawings, wherein FIG. 1 diagrammatically illustrates a cement producing plant according to the invention, in which ferrous sulfate is fed from a common silo to cement mills connected in parallel to the silo, and FIG. 2 diagrammatically illustrates part of a modified embodiment of the plant shown in FIG. 1.

The cement producing plant illustrated in FIG. 1 comprises a silo 10 having three funnel outlets 11 at the bottom and a filter 12 at the top. The silo contains particulate ferrous sulfate FS of the previously mentioned type sold under the trade marks MELSTAR and FERROMEL-20. Suitable batches of ferrous sulfate may be removed from the outlets 11 by means of selectively operatable vibrating devices 13 and collected in corresponding containers 14. Metering devices 15 are positioned at the bottoms of the containers 14 and each of the metering devices may comprise a screw conveyor driven by an electric motor 15', which may be controlled by an electronic control device 16 as described in further detail below. Each of the metering devices 15 provides a continuous, controlled, metered flow of ferrous sulfate through an air sluice 17' and into a pneumatic transporting device 17 comprising a transporting conduit 18. The conduits 18 are connected to three different mills 19a, 20, and 21 in three otherwise separated cement producing plants. A starting material comprising cement binder clinker C, gypsum G and possibly other components, is supplied to the inlet 22 of each mill. In the drawings two feeding devices 23 and 24 provided with corresponding measuring devices 23' and 24', respectively, for feeding a continuous flow of cement binder clinker and gypsum, respectively, are illustrated, and the transporting conduits 18 open into the inlet 22 so that the metered flow of ferrous sulfate provided by each of the metering devices 15 is added to the starting material at the cement mill inlet 22.

Each of the containers 14 and the associated metering device 15 forms a unit which is supported by a weighing cell 25. This cell generates weight signals representing the actual total weight of the associated unit. It is understood that the rate of weight reduction of each unit corresponds to the rate at which ferrous sulfate is fed to the transporting device 17 by means of the corresponding metering device 15. Therefore, the control device 16 may control the feeding rates of the metering devices 15 in response to signals received from the weighing cells 25 and to corresponding signals received from feeding devices for feeding starting material to the cement mills, so as to provide that a desired percentage by weight of ferrous sulfate is continuously added to the starting material fed to each of the cement mills 19a, 20 and 21. When the amount of ferrous sulfate contained in one or more of the containers 14 has reached a predetermined minimum, which means that the corresponding weighing cell 25 has determined a predetermined minimum weight of the corresponding unit, the control device 16 may establish communication between the silo 10 and the container 14 and operate the corresponding vibrating device 13 so as to fill a new batch of ferrous sulfate from the silo 10 into the corresponding container 14.

Apart from the system descibed above for feeding metered flows of ferrous sulfate to the respective cement mills, the cement production plants shown in the drawings are of known types. In the upper part of FIG. 1 a two stage grinding plant comprising two separate mills 19a and 19b, which are connected in series, is shown. As mentioned above, the ferrous sulfate may be supplied to the inlet 22 of the cement mill 19a through the conduit 18. However, the supply of ferrous sulfate may, alternatively or additionally, be supplied to the inlet of the last mill 19b through a transport conduit 18' and/or to outlets of the mill b through a transport conduit 18" as indicated with broken lines in FIG. 1.

The ground cement material leaving the cement mill 19a is lifted by an elevator 26 and passed to the inlet of the cement mill 19b through a conduit 27. Ventilating air from the cement mills 19a and 19b is conveyed through conduits 28 and 29 to an electrostatic precipitator 30 and exhausted into the atmosphere. Dust material separated from the air by the precipitator 30 is delivered to an outlet transporting device 31 which is also connected to the outlet of the cement mill 19b. The finished cement composition from the outlet transporting device 31 may be conveyed to a storage silo 33 by means of a suitable mechanical or pneumatic transporting device 34. Ground cement composition from the mill 19a may by-pass the mill 19b through a transporting device 32 if it is desired to operate the plant with one mill only.

In case the ferrous sulfate is supplied to the plant at two or more locations, different types of chromate reducing agents may be added at the various locations. For example, ferrous sulfate could be added at the inlet 22, and other suitable chemical compositions could be added between the mills 19a and 19b or between the mill 19b and the storage silo 33. Alternatively, ferrous sulfate in particulate form with coated particles as described above could be added at the inlet 22, and dried particulate ferrous sulfate with uncoated particles could be supplied at one or both of the other locations, or vice versa.

FIG. 2 shows a cement grinding plant with a single cement mill 20, and parts corresponding to those shown in FIG. 1 have been designated with the same reference numerals. The ground material leaving the outlet of the cement mill is lifted by the elevator 26 and delivered to an air separator 44 through a transporting device 35. The separator separates finer particles from coarser particles. The coarser particles are returned to the inlet of the cement mill 20 through a return transporting device 36, while air or gas and the finer particles are passed to a cyclone 37. In the cyclone 37 the solid material is separated from the air which is recycled through a transporting device 38, while the finer particles of the solid material is passed to a product outlet 39 through a transporting device 40. The finished product is transported from the product outlet 39 to a suitable storage site, such as a silo 33 by means of a pneumatic transporting device 34.

In operation, the mills 19-21 are rotated together with cement material and grinding balls contained therein. The mechanical energy thus supplied to the mills is converted into heat energy. In order to maintain the temperature in the mills at an acceptable level, normally within the temperature range 120°-140° C., a cooling liquid, normally cooling water, is sprayed or atomized within the mills by means of suitable spraying devices 43. Consequently, the atmosphere within the cement mills is very humid.

In a plant of the type shown in FIG. 2 the ferrous sulfate may be supplied through the conduit 18 to the conduit 36 returning coarse material from the separator 44. However, the ferrous sulfate may, alternatively or additionally, be supplied to the transporting device 40 through a conduit 41 and/or to the outlet of the mill 20 through a conduit 42 indicated with broken lines.

It should be understood that any of the cement mills 20 and 21 shown in FIG. 1 may constitute part of a grinding plant like any of those shown in the upper part of FIG. 1 or in FIG. 2, or of any other known type. Furthermore, the ferrous sulfate may be supplied to the grinding plant in dry condition at any suitable location securing a thorough mixing with the other cement components.

EXAMPLE 1

In a cement-producing plant of the type illustrated in FIG. 2, rapid hardening cement was ground in a cement mill, and a chromate-reducing agent comprising 96% $FeSO_4.7H_2O$ and provided with an oxidation-preventing coating ("MELSTAR") was metered to the inlet 22 of the mill 20. The final cement product was transported about 350 m by means of the pneumatic transporting device 34 from the cement mill 20 to the storage silo 33.

The amount of ferrous sulfate added was 0.47%, calculated on the weight of the cement. At the start of the experiment, the cement contained 8.2 ppm Cr water-soluble chromate which is a typical value. Samples were withdrawn every hour immediately after the product had left the cement mill.

During the sampling for 7 hours after the start of the experiment, practically no water-soluble chromate could be detected in the cement samples. The dosage of ferrous sulfate was then reduced to 0.40%. During the last three hours of the experiment, a small, but measurable content of water-soluble chromate in the cement was detected in the samples taken immediately after the product had left the mill. In comparison with laboratory experiments, it was found that the same satisfactory extent of reduction of water-soluble chromate required 0.47% of ferrous sulfate, calculated on the cement, in the production plant, compared with 0.35% in the laboratory experiment.

A sample taken from the silo 33 immediately after the termination of the experiment showed a low value of water-soluble chromate which was of the same order as the value for the last three hours of production. This indicates that the reducing capacity of the 0.4% of ferrous sulfate in the cement which had been transported about 350 m by a pneumatic conveyor was not deteriorated by the major exposure to air during transport.

The amount of water-soluble chromate in the cement was determined by extracting a cement sample (3 g) with a 20% solution of sodium sulfate and measuring the amount of dissolved chromate in the extract by a colorimetric diphenyl carbazide method using a 5 cm cuvette in the spectrophotometer to ensure maximum sensitivity. The results of the above experiments appear from table I below:

TABLE I

| Sampling time | | Free chromate ppm Cr. |
|---|---|---|
| Date | Hour | |
| 28.02.80 | 11.00 | 8.2 |
| 28.02.80 | 12.00 | <0.1 |
| 28.02.80 | 14.30 | <0.1 |
| 28.02.80 | 15.00 | <0.1 |
| 28.02.80 | 16.00 | <0.1 |
| 28.02.80 | 18.00 | <0.1 |
| 28.02.80 | 19.00 | <0.1 |
| 28.02.80 | 20.00 | <0.1 |
| 28.02.80 | 21.00 | 0.5 |
| 28.02.80 | 22.00 | 0.2 |
| 28.02.80 | 23.00 | 0.1 |

Within a period of 3 months after storing the cement mixture in the storage silo, samples were taken from the bottom of the silo in connection with delivery of cement from the silo, and the contents of water-soluble chromate in the samples were determined. The content of water-soluble chromate in the cement as a function of storage time in the silo appears from table II. During the first 11 days the content of water-soluble chromate increases to 1 ppm Cr, and during the following two months, the content of water-soluble chromate varies between 1 and 2 ppm Cr. This indicates that there is a minor decrease in the reducing capacity of the ferrous sulfate, but the ferrous sulfate is still capable of reducing 75-90% of the original content of water-soluble chromate in the cement even after 2-3 months of storage.

It should be noted that the theoretical amount of ferrous sulfate which would stoichiometrically correspond to reduction in the initial concentration of water-soluble chromate in the cement is only 0.013% $FeSO_4.7H_2O$, in other words, the amount of ferrous sulfate added in the above experiment represents an excess of more than 30 times, which is presumed to be due to other chemical reactions taking place. It is envisaged that the use of ferrous sulfate containing a more efficient coating and/or the addition of ferrous sulfate at different stages during the production may reduce the amount of ferrous sulfate necessary for obtaining an adequate chromate-reducing effect.

TABLE II

| Date | Storage time, days | Water-soluble chromate ppm Cr |
|---|---|---|
| 29.02.80 | 0 | 0.3 |
| 10.03.80 | 11 | 1.0 |
| 27.03.80 | 28 | 1.0 |
| 16.04.80 | 48 | 1.0 |
| 20.05.80 | 82 | 0.9–2.1 |

EXAMPLE 2

An experiment similar to that described in example 1 was carried out in a cement-producing plant of the same type. The amount of ferrous sulfate ($FeSO_4.7H_2O$) added was 0.6% calculated on the weight of the cement. At the start of the experiment, the cement contained 10.0 ppm Cr water-soluble chromate. A sample was withdrawn every hour immediately after the product had left the cement mill, and the samples for each period of eight hours were mixed to constitute a representative sample for the respective period. The amount of water-soluble chromate in the cement was determined as described in example 1. The results obtained are stated in table III:

TABLE III

| Sampling time | | Free chromate ppm Cr |
|---|---|---|
| Date | Hour | |
| 07.10.80 | 14-22 | <0.1 |
| 07.10.80 | 22-06 | <0.1 |
| 08.10.80 | 06-14 | <0.1 |
| 08.10.80 | 14-22 | <0.1 |
| 08.10.80 | 22-06 | <0.1 |
| 09.10.80 | 06-14 | 0.1 |
| 09.10.80 | 14-22 | <0.1 |
| 09.10.80 | 22-06 | <0.1 |
| 10.10.80 | 06-14 | <0.1 |
| 10.10.80 | 14-22 | <0.1 |

It appears that in almost all of the samples the content of water-soluble chromate was less than 0.1 ppm Cr, i.e. the amount was below the measuring limit. Within a period of 63 days after storing the cement composition in the storage silo, batches were removed and delivered to a selected customer, and simultaneously, a sample was taken from each batch. The content of water-soluble chromate was determined for each of the samples of cement in the manner described above, and also for a sample of each of the batches after mixing them with water in a concrete mixer. The results obtained are stated below in table IV:

TABLE IV

| | | Water-soluble chromate ppm Cr | |
|---|---|---|---|
| Date | Storage time, days | Samples from cement | Samples from wet concrete |
| 08.10.80 | 0 | <0.1 | <0.1 |
| 27.10.80 | 19 | <0.1 | <0.1 |
| 28.10.80 | 20 | <0.1 | <0.1 |
| 29.10.80 | 21 | <0.1 | <0.1 |
| 30.10.80 | 22 | <0.1 | <0.1 |
| 31.10.80 | 23 | <0.1 | <0.1 |
| 05.11.80 | 28 | <0.1 | <0.1 |
| 13.11.80 | 36 | 1.5 | <0.1 |
| 19.11.80 | 42 | <0.1 | <0.1 |
| 26.11.80 | 49 | <0.1 | <0.1 |
| 03.12.80 | 56 | 0.4 | <0.1 |
| 10.12.80 | 63 | 0.4 | <0.1 |

It appears that no content of water-soluble chromate could be determined in the batches of wet concrete mixture, while small amounts were determined in three of the cement samples taken. This is probably due to the fact that the samples taken out are less representative and more influenced by incidental variations than the batches which were thoroughly mixed in a concrete mixer before determination of the chromate content.

EXAMPLE 3

In a cement-producing plant corresponding to that shown in FIG. 1 ferrous sulfate was supplied to three different cement-grinding plants connected in parallel, from a common silo in the manner illustrated in FIG. 1. Two of the cement-grinding plants each included two cement mills connected in series, and the third grinding plant contained a single cement mill.

The ferrous sulfate, which was of the type marketed by Melchemie B.V., Arnhem, Holland, under the trade mark FERROMEL-20, was added in an amount of 0.4 percent by weight. In the two-stage grinding plants, ferrous sulfate was added between the mills, while the ferrous sulfate was added at the inlet of the mill in the single-stage plant.

During a 2½ month period, four different types of cement were produced, namely normal Portland cement, rapid-hardening cement, low alkali/sulfate-resistant cement, and Portland cement containing fly ash. Every day in the said 2½ months period, a representative sample of the production of the day was taken at the outlet of each of the grinding plants.

The amount of water-soluble chromate in the cement was determined by extracting each cement sample (3 g) with pure water, and measuring the amount of dissolved chromate in the extract by a colorimetric diphenyl carbazide method using a 5 cm cuvette in the spectrophotometer to ensure maximum sensitivity. No measurable content of water-soluble chromate was detected in any of the samples, which means that the content of free chromate was less than 0.1 ppm Cr.

I claim:

1. A method for reducing chromate dermatitis, comprising:
    feeding a continuous flow of a starting material mixture comprising cement binder clinker into a cement mill, the mixture containing water soluble chromate;
    grinding the starting material in the cement mill;
    continuously transferring ground cement material from the cement mill to a storage container;
    adding non-dissolved ferrous sulfate in an amount of 0.3-1 percent by weight to said flow of material at least at one location upstream of the storage container; and
    mixing the ferrous sulfate with the ground cement material so as to produce a cement composition in which the water-soluble chromate is chemically reduced when water is added to and mixed with the composition.

2. The method of claim 1 wherein the ferrous sulfate is a particulate material coated with an oxidation preventing coating.

3. The method according to claim 1, wherein the ferrous sulfate is added in an amount of about 0.4 percent by weight.

4. The method according to claim 1, wherein at least part of the ferrous sulfate is added to the starting material as a metered flow prior to feeding the starting material into the cement mill.

5. The method according to claim 1, wherein the starting material is fed into a cement mill of the multi-stage type, and wherein at least part of the ferrous sulfate is added to the starting material between consecutive stages of the mill.

6. The method according to claim 1, wherein at least part of the ferrous sulfate is added to and mixed with the ground starting material at a location downstream of the cement mill and upstream of the storage container.

7. The method according to claim 1, wherein the starting material mixture contains about 8.2 to 10 ppm Cr as water-soluble chromate.

8. The method according to claim 7, wherein the ferrous sulfate is a particulate material coated with an oxidation preventing coating.

* * * * *